United States Patent
Chang et al.

(10) Patent No.: US 9,300,015 B2
(45) Date of Patent: Mar. 29, 2016

(54) SYSTEMS AND METHODS FOR MONITORING AND CHARACTERIZING INFORMATION HANDLING SYSTEM USE BEHAVIOR

(75) Inventors: Chia-Fa Chang, Linkou Township, Taipei County (TW); Hua Chung, Taipei (TW); Ligong Wang, Round Rock, TX (US); Yung Fa Chueh, Hsichin (TW)

(73) Assignee: Dell Products LP, Round Rock, TX (US)

( * ) Notice: Subject to any disclaimer, the term of this patent is extended or adjusted under 35 U.S.C. 154(b) by 1059 days.

(21) Appl. No.: 12/799,871

(22) Filed: May 4, 2010

(65) Prior Publication Data
US 2011/0276810 A1    Nov. 10, 2011

(51) Int. Cl.
*G06F 1/26* (2006.01)
*H01M 10/42* (2006.01)
*G06F 1/28* (2006.01)

(52) U.S. Cl.
CPC ........... *H01M 10/4257* (2013.01); *G06F 1/263* (2013.01); *G06F 1/28* (2013.01); *H01M 2010/4271* (2013.01); *H01M 2010/4278* (2013.01)

(58) Field of Classification Search
CPC ................ H01M 10/4257; H01M 2010/4271; H01M 2010/4278; G06F 1/263; G06F 1/28; G06F 1/26
USPC .................. 713/300, 310, 320–324, 330, 340
See application file for complete search history.

(56) References Cited

U.S. PATENT DOCUMENTS

| | | |
|---|---|---|
| 5,442,274 A | 8/1995 | Tamai |
| 5,808,447 A | 9/1998 | Hagino |
| 6,049,193 A | 4/2000 | Chien |
| 6,483,274 B2 | 11/2002 | Lee |
| 7,150,402 B2 * | 12/2006 | Chang ...................... 235/472.02 |
| 7,197,656 B2 * | 3/2007 | Nguyen et al. ................ 713/340 |
| 7,286,556 B1 * | 10/2007 | Jackson ........................ 370/445 |

(Continued)

FOREIGN PATENT DOCUMENTS

| | | |
|---|---|---|
| EP | 2309583 A1 | 10/2010 |
| JP | 2008113512 A | 5/2008 |

(Continued)

OTHER PUBLICATIONS

Canon, "Battery Management For EOS-ID and IDs Mark III Cameras", Printed From Internet May 3, 2010, 8 pgs.

(Continued)

*Primary Examiner* — Fahmida Rahman
(74) *Attorney, Agent, or Firm* — Egan, Peterman, Enders & Huston LLP

(57) ABSTRACT

Desktop power use behavior may be detected while a portable information handling system or any other type of battery powered information handling, system is operating on external power such as an AC adapter. The desktop power use behavior may be detected by monitoring one or more power usage parameters to detect usage characteristics that indicate a battery powered information handling system is being operated in a manner that is similar to operation of a desktop information handling system. Upon detection of desktop behavior, one or more processing devices of the information handling system may respond by taking one or more desktop use response actions.

39 Claims, 4 Drawing Sheets

(56) References Cited

U.S. PATENT DOCUMENTS

| | | | |
|---|---|---|---|
| 7,378,819 B2 | 5/2008 | Wang et al. | |
| 7,391,184 B2 | 6/2008 | Luo et al. | |
| 7,489,108 B2 | 2/2009 | Matsumoto et al. | |
| 8,819,703 B2 * | 8/2014 | Pasupathilingam | G06F 9/4443 709/204 |
| 2002/0171397 A1 * | 11/2002 | Adrian et al. | 320/119 |
| 2003/0097188 A1 * | 5/2003 | O'Mahoney et al. | 700/17 |
| 2004/0236969 A1 * | 11/2004 | Lippert et al. | 713/300 |
| 2004/0255174 A1 * | 12/2004 | Chen et al. | 713/300 |
| 2005/0086545 A1 * | 4/2005 | Breen et al. | 713/300 |
| 2008/0238358 A1 | 10/2008 | Koide et al. | |
| 2009/0160402 A1 | 6/2009 | Wang et al. | |
| 2010/0083008 A1 * | 4/2010 | Jakes et al. | 713/300 |
| 2010/0097118 A1 | 4/2010 | Wang et al. | |
| 2010/0194340 A1 | 8/2010 | Lim | |
| 2010/0218187 A1 * | 8/2010 | Pasupathilingam et al. | 718/100 |
| 2010/0295513 A1 * | 11/2010 | McCollum et al. | 320/134 |
| 2011/0084662 A1 | 4/2011 | Yang et al. | |

FOREIGN PATENT DOCUMENTS

| | | |
|---|---|---|
| KR | 10-2009-0096630 | 9/2009 |
| KR | 20110039677 | 4/2011 |
| WO | WO2008/078235 A2 | 7/2008 |

OTHER PUBLICATIONS

Texas Instruments, Single-Cell Li-Ion and Li-Pol Battery Gas Gauge IC For Handheld Applications (bqJunior™ Family), BQ26501, SLUS586B, Revised Mar. 2004, 25 pgs.

Texas Instruments, "Package Option Addendum", Apr. 22, 2008, 1 pg.

Texas Instruments, Package Material Information, Apr. 21, 2009, 2 pgs.

Texas Instruments, "Plastic Small-Outline Package", PW (R-PDSO-G), MTSS001C, Revised Feb. 1999, 2 pgs.

Samsung N120 Review, Article dated May 2009, this copy printed from Internet on Oct. 5, 2010, 20 pgs.

Long Battery Life with a 12.1 LCD (CF-W8/T8) and a 14.1 LCD (CF-F8), describes features Publically available before the May 4, 2010 filing date of the present application, 3 pgs.

Screen shots of Functionality publically available on Sony Vaio Computers prior to the May 4, 2010 filing date of the present application, 8 pgs.

Screen shots of Functionality publically available on Samsung Computers prior to May 4, 2010 filing date of the present application, 1 pg.

ThinkVantage, "Power Manager Deployment Guide", labeled Feb. 1, 2010, 36 pgs.

ThinkVantage, "Power Manager Deployment Guide", labeled both Jun. 17, 2010 and "Fifth Edition (Mar. 2010)", 47 pgs.

Samsung, Battery Life Extender, Printed from Internet on Jan. 15, 2013, a portion of which includes some information posted on the Internet on Oct. 19, 2009 and Oct. 20, 2009 (see first four posts on first two pages), 4 pgs.

Lim, System Of Charge And Discharge For Secondary Battery And Method Of Controlling Charge And Discharge For Secondary Battery, U.S. Appl. No. 61/149,964, filed Feb. 4, 2009; 16 pgs.

* cited by examiner

SYSTEMS AND METHODS FOR MONITORING AND CHARACTERIZING INFORMATION HANDLING SYSTEM USE BEHAVIOR

FIELD OF THE INVENTION

This invention relates generally to information handling systems, and more particularly to monitoring and characterizing information handling system use behavior.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored; or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by rechargeable battery pack systems such as lithium ion ("Li-ion") or nickel metal hydride ("NiMH") battery packs. Notebook computers are often used with external AC power supplied by an AC adapter. Notebook computer users often operate notebook computers on external AC adapter power for extended periods of time without removing AC power, using the battery cells of the notebook computer in a manner similar to operation of a desktop computer on an uninterruptable power supply (UPS). During such extended times of AC adapter operation, battery cells of the battery pack systems remain at substantially fully charged status and at an elevated temperature. Since permanent battery degradation occurs more rapidly at higher battery voltages and higher battery temperatures, extended AC adapter operation time tends to accelerate notebook computer permanent battery degradation and therefore to shorten battery life. This results in the need to replace battery packs more often. Moreover, extended times of AC adapter operation interfere with the opportunity to perform a learning procedure to recalibrate the full charge capacity (FCC) value for the battery pack.

SUMMARY OF THE INVENTION

Disclosed herein are systems and methods for monitoring and characterizing information handling system use behavior. Using the disclosed systems and methods, desktop power use behavior may be detected while a portable information handling system or any other type of battery powered information handling system is operating on external power such as an AC adapter. The desktop power use behavior may be detected, for example, by a battery management unit (BMU) of a battery system, an embedded controller of the information handling system itself, and/or any other processing device associated with the information handling system. Thus, in one exemplary embodiment, the disclosed systems and methods may be implemented using existing hardware components of a battery-powered information handling system without extra cost for additional hardware, and in a further exemplary embodiment may be implemented using a processing device (e.g., battery management unit) of a battery system without requiring changes to the system BIOS.

Using the disclosed systems and methods, desktop power use behavior may be detected by monitoring one or more power usage parameters to detect usage characteristics that indicate a battery powered information handling system is being operated in a manner that is similar to operation of a desktop information handling system. Examples of such usage characteristics include, but are not limited to, exceeding a threshold amount of time or fraction of cumulative time that the battery powered information handling system has been continuously operating on external power and/or exceeding a threshold amount of time or fraction of cumulative time that the battery relative state of charge (RSOC) has remained above a threshold minimum RSOC value.

Upon detection of desktop behavior, one or more processing devices of the information handling system may respond by taking one or more desktop use response actions, e.g., displaying a message to a user of the information handling system that alerts the user that desktop behavior has been detected, giving a user the option to execute a desktop utility or other utility to correct the desktop behavior situation and/or initiate a battery system learning procedure, automatically running a utility to correct the desktop behavior situation and/or initiated a battery system learning procedure without user permission, etc.

In one respect, disclosed herein is an information handling system, including: one or more processing devices; a battery system including one or more battery cells; battery charger circuit coupled to receive current from an external source and to provide current for recharging the battery cells of the battery system; and a system load coupled to selectably receive current from either one of an external power source or the battery system. The one or more processing devices of the information handling system may be configured to: monitor one or more power usage parameters of the information handling system, detect usage characteristics from the monitored power usage parameters to determine whether or not the information handling system is being operated with a pre-defined desktop power use behavior, and take one or more desktop use response actions if the detected usage characteristics indicate the information handling system is being operated with a pre-defined desktop power use behavior.

In another respect, disclosed herein is a method for operating an information handling system, including: providing an information handling system including one or more processing devices, a battery system including one or more battery cells, battery charger circuit coupled to receive current from an external source and to provide current for recharging the battery cells of the battery system, and a system load coupled to selectably receive current from either one of an external power source or the battery system; monitoring one or more power usage parameters of the information handling system; detecting usage characteristics from the monitored power usage parameters; determining whether or not the information handling system is being operated with a predefined desktop power use behavior based on the detected usage characteristics; and taking one or more desktop use response actions if the detected usage characteristics indicate the information handling system is being operated with a pre-defined desktop power use behavior.

In another respect, disclosed herein is a battery system configured to be coupled in operational electrical contact by at least one terminal node to provide current to a system load of an information handling system that is separate from the battery system, the battery system including: one or more battery cells; and a first processing device configured to be communicatively coupled in signal communication by at least one terminal node with a second processing device of the information handling system that is separate from the battery system. The first processing device may be configured to: monitor one or more power usage parameters of the information handling system, detect usage characteristics from the monitored power usage parameters to determine whether or not the information handling system is being operated with a pre-defined desktop power use behavior, and inform the second processing device by signal communication that desktop power use behavior has been detected.

DESCRIPTION OF ILLUSTRATIVE EMBODIMENTS

Figure 1:
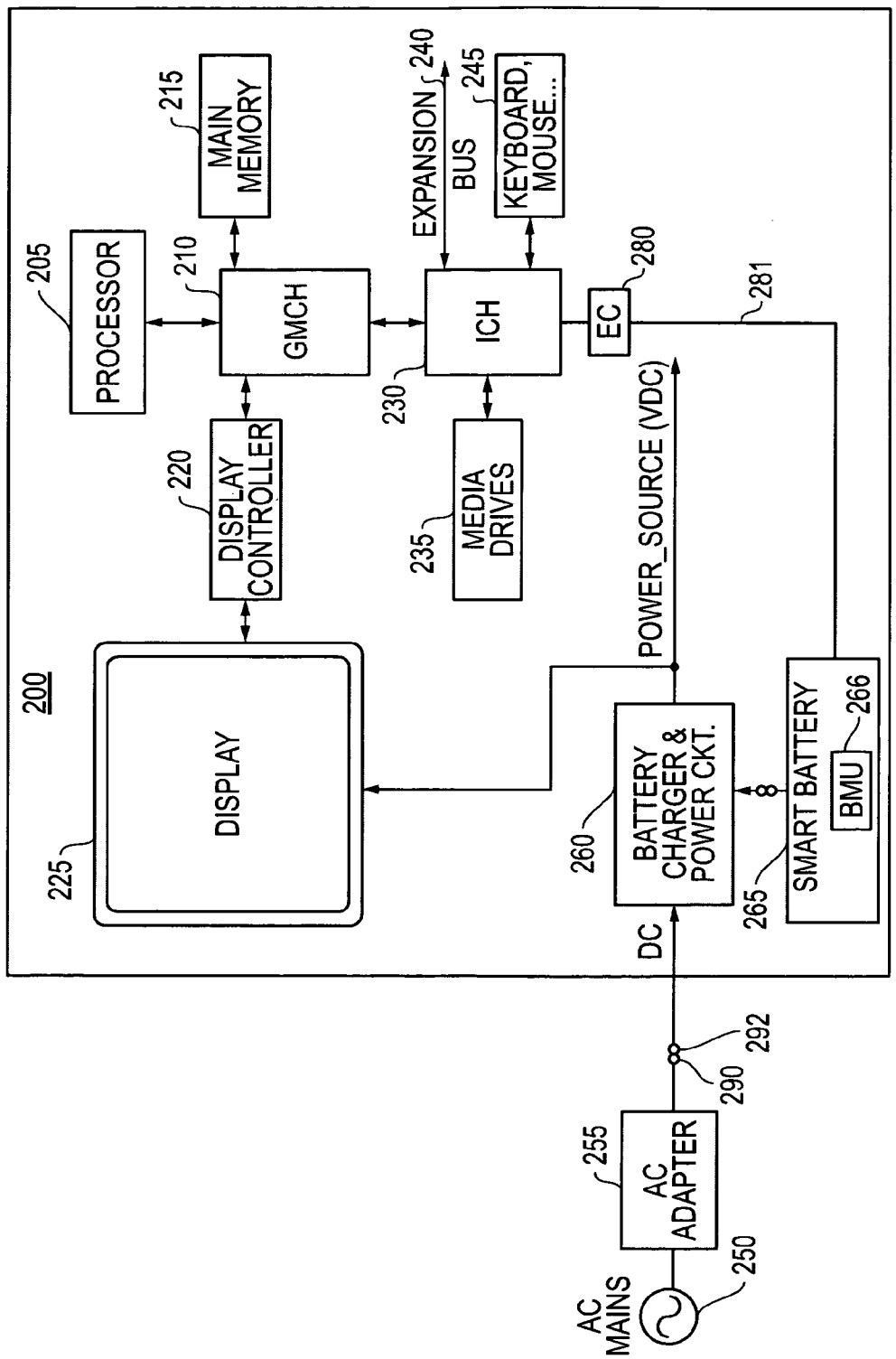
FIG. 1 is a block diagram of an information handling system according to one exemplary embodiment of the disclosed systems and methods.
Figure 2:
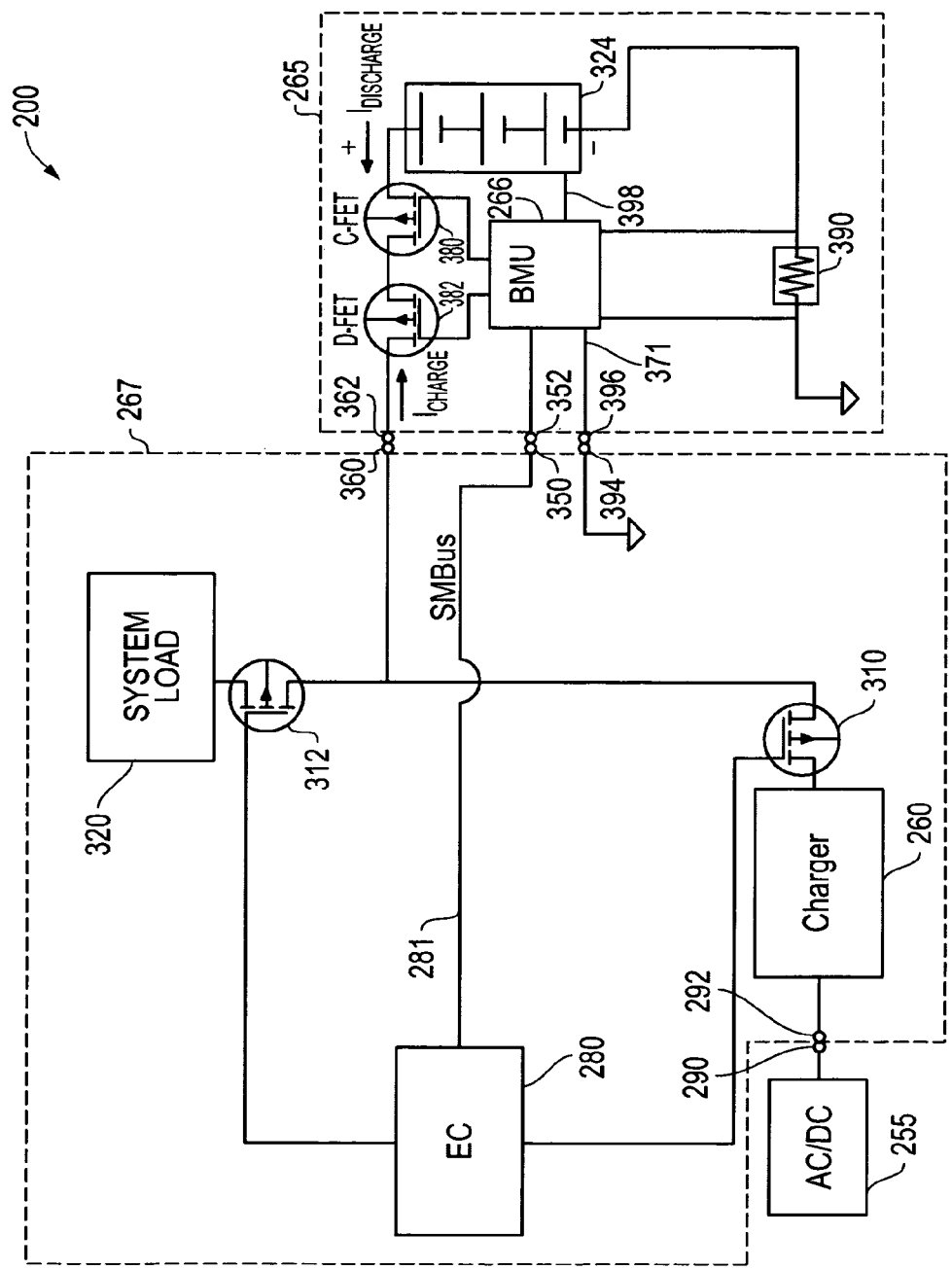
FIG. 2 is a block diagram of an information handling system according to one exemplary embodiment of the disclosed systems and methods.

FIG. 1 is a block diagram of an information handling system 200 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 2, information handling system 200 of this exemplary embodiment includes a processor 205 such as an Intel Pentium series processor, an Advanced Micro Devices (AMD) processor or one of many other processors currently available. A graphics/memory controller hub (GMCH) chip 210 is coupled to processor 205 to facilitate memory and display functions. System memory 215 and a display controller 220 are coupled to GMCH 210. A display device 225 (e.g., video monitor) may be coupled to display controller 220 to provide visual images (e.g., via graphical user interface) to the user. An I/O controller hub (ICH) chip 230 is coupled to GMCH chip 210 to facilitate input/output functions for the information handling system. Media drives 235 are coupled to ICH chip 230 to provide permanent storage to the information handling system. An expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230.

In this particular embodiment, information handling system 200 is coupled to an external source of power, namely AC mains 250 and AC adapter 255. It will be understood that external power may alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280. Battery charger/power circuit 260 of information handling system 200 may also provide DC power for recharging battery cells of the battery system 265 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load of the information handling system and to exchange data with one or more processing devices of the information handling system. For example, as shown for the exemplary embodiment of FIG. 2, replaceable smart battery pack 265 may be removably coupled to, and is separable from, other system components 267 of information handling system 200 at a terminal node by engagement of system side electrical power terminals 360, 394 with battery pack side electrical power terminals 362, 396 (operational electrical contact). In this regard, smart battery pack 265 may include battery cell circuitry 324 coupled to electrical power terminals 362 that are configured to be removably coupled to system side electrical power terminals 360 so that terminals 360 contact terminals 362 to allow current to be interchanged between smart battery pack 265 and other system components 267 of information handling system 200. Battery cell circuitry 324 may be any type of rechargeable battery cell/s or combination thereof that is suitable for recharging. Examples of such battery cells include, but are not limited to, Li-ion battery cells, NiMH battery cells, nickel cadmium (NiCd) battery cells, lithium-polymer (Li-polymer) battery cells, etc.

Battery pack 265 also includes SMBus terminals 352 that are configured to be removably coupled to system side SMBus terminals 350 to allow data to be interchanged between smart battery pack 265 and EC 280. A logic control circuitry 398 is also present to control and convey battery cell status information to BMU 266 from battery cell circuitry 324, and to convey control signals BMU 266 to switching circuitry that is coupled between battery cell circuitry 324 in a manner that will be described further herein. It will be understood that functions of EC 280 may alternatively be performed by a keyboard controller in other embodiments. Also shown in FIG. 2 are switching elements 310 and 312 which are each controlled by EC 280, and which may be present to regulate current flow from charger 260 and to regulate current flow to system load 320, respectively. In this regard, system load 320 may comprise system components such as display 225, processor 205, media drives 235, etc. of FIG. 1, and/or may include additional, fewer or alternative system components that draw current. It will be understood that any other number and/or type of switching elements suitable for controlling current flow between charger 260, system load 320 and/or battery pack 265 may be present. Examples of types of suitable switching elements include, but are not limited to, bipolar junction transistors (BJTs) and field effect transistors (FETs).

Smart battery pack 265 is also shown provided with battery current control circuitry to control flow of charge current to battery cell circuitry 324 of battery pack 265, and to also control flow of discharge current from battery cell circuitry 324 of battery pack 265. In this exemplary embodiment, the charge and discharge circuitry includes two field effect transistors ("FETs") 380 and 382 coupled in series between battery charge terminal 362 and battery cell circuitry 324. FET 380 is a charge FET switching element that forms a part of a charge circuit that is controlled by components (e.g., microcontroller and/or AFE) of BMU 266 to allow or disallow charge current to the battery cell circuitry 324, and FET 382 is a discharge FET switching element that forms a part of discharge circuit that is controlled by components (e.g., microcontroller and/or AFE) of BMU 266 to allow or disallow discharge current from the battery cell circuitry 324. Body diodes may be present across the source and drain of each FET switching element, i.e., to conduct charge current to the battery cell/s when the discharge FET switching element 382 is open, and to conduct discharge current from the battery cell/s when the charge FET switching element 380 is open. It will be understood that battery current control circuitry of battery pack 265 may include any other number and/or type of charge and discharge switching elements suitable for performing the current control tasks described herein. Examples of types of suitable switching elements include, but are not limited to, bipolar junction transistors (BJTs) and field effect transistors (FETs).

During normal battery pack operations both charge and discharge FET switching elements 380 and 382 are placed in the closed state by BMU 266, which also monitors voltage of battery cell circuitry 324. If BMU 266 detects a battery over-voltage condition, BMU 266 opens the charge FET switching element 380 to prevent further charging of the battery cell/s until the over-voltage condition is no longer present. Similarly, if BMU 266 detects a battery under-voltage (or over-discharge) condition, BMU 266 opens the discharge FET switching element 382 to prevent further discharging of the battery cell/s until the under-voltage condition is no longer present. BMU 266 may also open the charge FET switching element 214 when the battery pack is in sleep mode. A current sense resistor 390 is present in the battery pack circuitry to allow BMU 266 to monitor charge current to the battery cell/s. Further information on BMU, battery pack and battery charging operations may be found in U.S. Pat. No. 7,378,819, U.S. Pat. No. 7,391,184, and U.S. patent application Ser. No. 12/253,829 filed Oct. 17, 2008, each of which is incorporated herein by reference in its entirety.

It will be understood that the functions of BMU 266 described herein may be implemented using any circuitry and/or control logic configuration suitable for performing the tasks thereof. For example, in one embodiment, one or more features of BMU 266 may be implemented using a controller (e.g., processor and associated firmware) that is integral to battery pack 265 or using any other suitable configuration of microcontroller/microprocessor, firmware and/or software that interfaces with battery pack circuitry/components. It will also be understood that the herein-described tasks of BMU 266 may be performed by a single integrated component or by two or more separate components. In addition, it will be understood that removal and reinstallation of a battery pack 265 in operational electrical contact with other components 267 of the information handling system may be monitored using any other alternative circuitry configuration to system-present pin 371 that is suitable for indication thereof. Furthermore, it will be understood that the particular configuration of components in FIGS. 1 and 2 is exemplary only and that other configurations of fewer, additional and/or alternative components are possible as are appropriate for a given particular type of battery-powered portable information handling system. It will also be understood that, when present, processing devices (such as EC 280 and BMU 266) may be communicatively coupled in signal communication with each other using any type of data communication bus or other type of signal communication technology suitable for transferring data therebetween.

Figure 3:
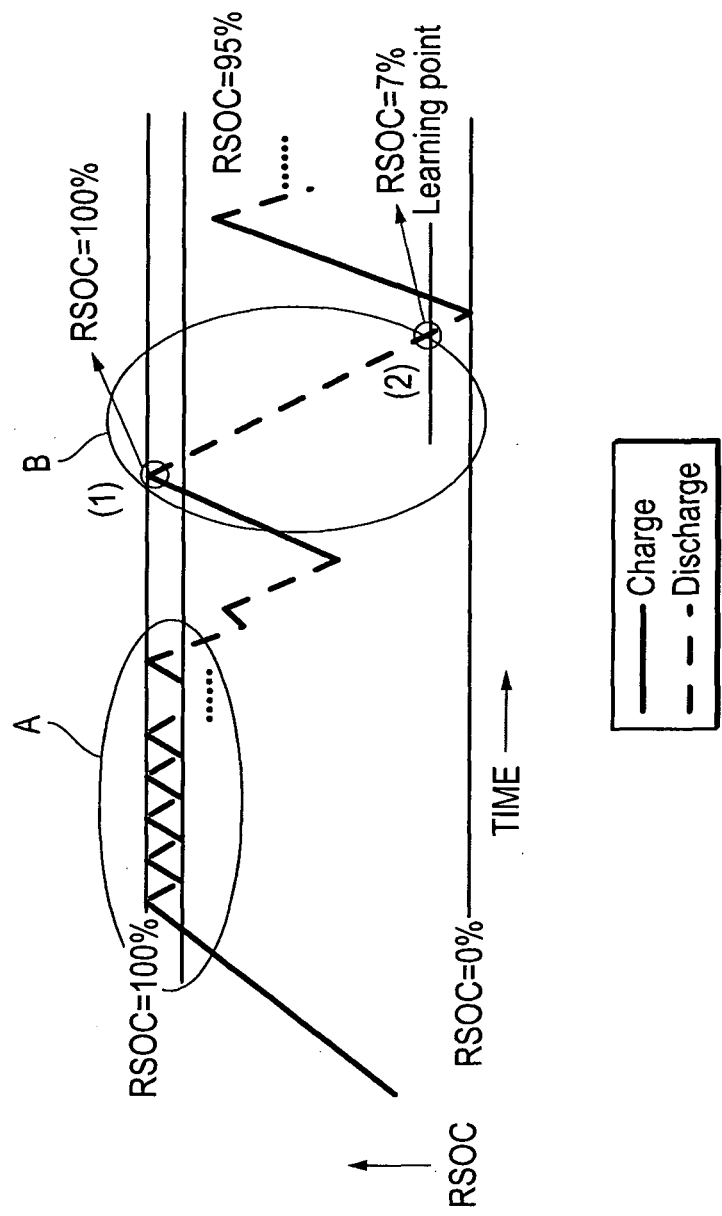
FIG. 3 illustrates relative state of charge (RSOC) versus time for a battery system of a portable information handling system.

FIG. 3 is a plot of relative state of charge (RSOC) versus time for a battery system of a portable information handling system, such as replaceable battery pack 265 of FIGS. 1 and 2. The circled area of Region A of FIG. 3 exhibits usage characteristics of desktop power use behavior as it may be defined in one exemplary embodiment of the disclosed systems and methods. As shown, the RSOC of the battery system cycles between 100% RSOC and 95% RSOC for a time duration "x", which may be an extended period of time such as several days or weeks. Time duration "x" may represent, for example, a time during which an AC adapter has been continuously coupled to power the information handling system, and during which the battery cells repeatedly self discharge followed by recharge. It is during such a time that the battery system remains substantially fully charged and at an elevated temperature, conditions under which battery degradation occurs more rapidly. The usage characteristics of Region A are the type of characteristics that are to be avoided by using the disclosed systems and methods. In contrast, normal battery-powered information handling system use behavior may be characterized in one embodiment by frequent relatively long charge and long discharge cycles, and long self-discharge cycles. For example, during normal battery-powered information handling system use, the battery system may frequently drop below 80% RSOC, and may be often substantially fully discharged or near fully discharged, e.g., to below about 10% RSOC.

Region B of FIG. 3 is an example of a learning procedure for a battery system of a portable information handling system, such as replaceable battery pack 265 of FIGS. 1 and 2. Such a learning procedure may be employed periodically to update the full charge capacity (FCC) value as permanent degradation occurs over time, including percent degradation that occurs due to desktop behavior of Region A. This updated value of FCC may be used, for example, by BMU 266 to calculate more accurate estimates of remaining battery life for display to a user, or for use by internal system processor to determine at what point to shut down the information handling system before insufficient battery charge remains for proper shut down. In the learning procedure of FIG. 3, the battery system discharges from about 100% RSOC at point (1) to about at learning point (2), before the battery cells are recharged as shown (e.g., to just under about 95% RSOC). A learning point (2) may be any suitably low value of RSOC to allow calculation of FCC, and is about 7% RSOC in FIG. 3. Normally, a user must remember to allow the battery system to discharge to the learning point to trigger the FCC recalibration. However, in one exemplary embodiment disclosed herein, upon detection of desktop behavior such as illustrated in Region A (e.g., by BMU 266), a user may be prompted to perform the learning procedure of Region B or such a learning procedure may be automatically performed by one or more processors of the information handling system.

Figure 4:
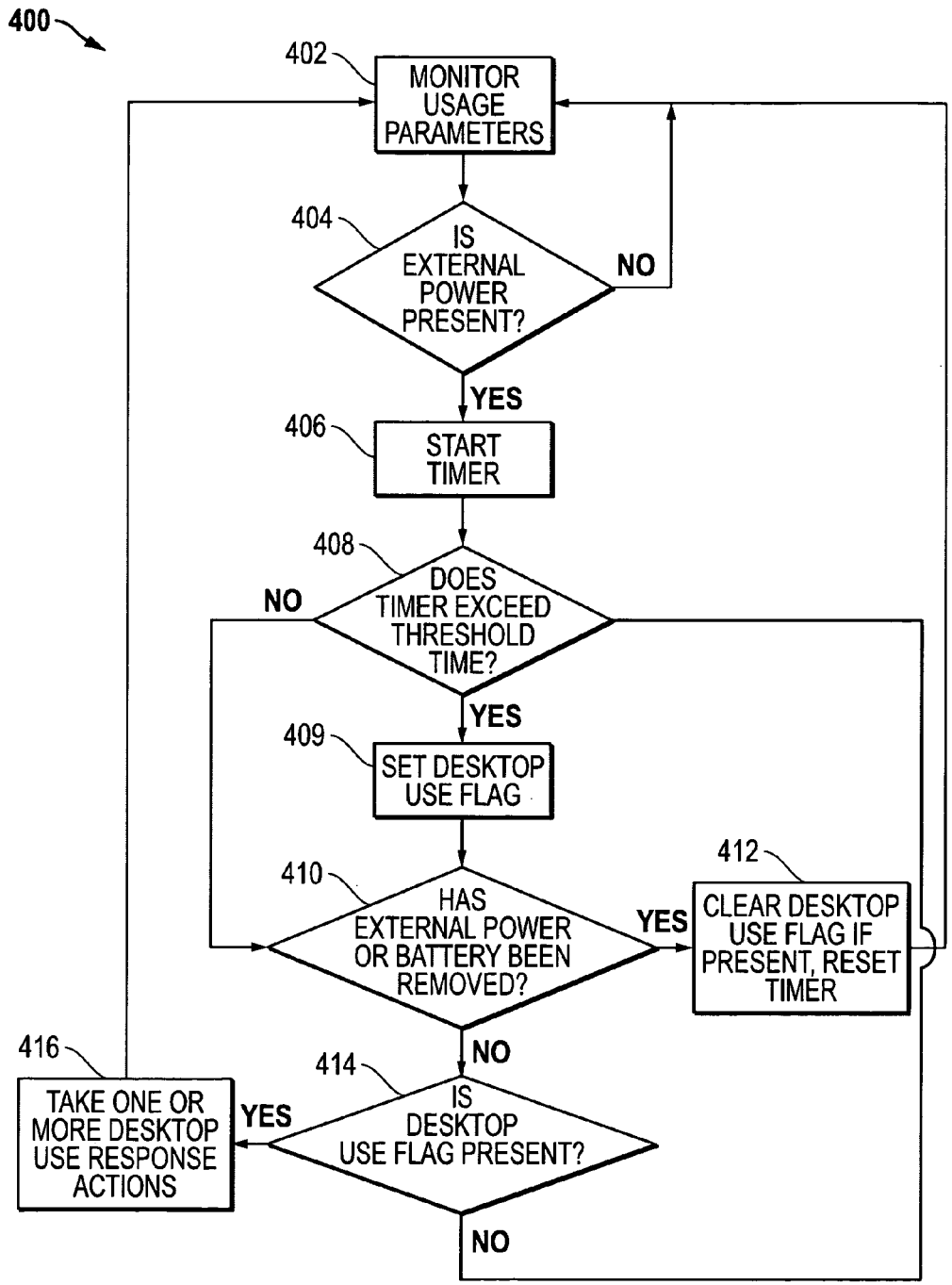
FIG. 4 illustrates a method for characterizing and responding to information handling system use behavior according to one exemplary embodiment of the disclosed systems and methods.

FIG. 4 illustrates a method 400 for characterizing and responding to information handling system use behavior according to one exemplary embodiment of the disclosed systems and methods. In this regard, method 400 will be described below as it may be implemented by portable information handling system 200 of FIGS. 1 and 2 using BMU 266, although the general methodology of method 400 may be implemented by any one or more processing devices on any other suitable configuration of information handling system that is selectably and/or alternatively powered by external power and one or more battery cells. Furthermore, it will be understood that one or more steps of method 400 may be implemented other processing device/s of information handling system 200 (e.g., such as embedded controller 280 and/or processor 205).

As shown in FIG. 4, method 400 starts at step 402 where BMU 266 of smart battery system 265 begins monitoring one or more power usage parameters of information handling system 200 in order to detect and characterize the current operation behavior, e.g., to determine if the monitored power usage parameters are characteristic or indicative of the fact that a user is operating battery powered information handling system 200 in a manner that is similar to operating a desktop information handling system. Examples of possible power usage parameters include, but are not limited to, presence of external power of AC adapter 255 supplied to battery powered information handling system 200, battery system relative state of charge (RSOC), or any other parameter that may be monitored to determine the amount of time that information handling system 200 is continuously operated on external power rather than battery power, or to determine the cumulative fraction of time within a given time period (e.g., percentage of time) that information handling system 200 is operated on external power rather than battery power. To make this determination, BMU 266 may determine, for example, if the amount of time that battery powered portable information handling system 200 has been continuously operating on external power of AC adapter 255 has exceeded a predefined threshold external power operating time and/or if the amount of time that battery powered portable information handling system 200 has been continuously operating with a battery relative state of charge (RSOC) above a threshold minimum RSOC value has exceeded a predefined threshold high RSOC operating time.

In the exemplary embodiment of FIG. 4, presence of external power of AC adapter 255 supplied to battery powered information handling system 200 is monitored. Based on the monitored usage parameter/s, BMU 266 characterizes the current operation behavior and alerts embedded controller (EC) 280 (e.g., via data communicated across SMBus 281) of detected desktop power use behavior. The system BIOS running on EC 280 may then take appropriate predefined action in response thereto based on the type of current operating behavior detected in a manner as will be described further herein. In other embodiments BMU 266 may also optionally notify EC 280 that detected behavior is not desktop user behavior (e.g., if step 404 or 414 state is "NO"), and/or that external power or battery has been removed (e.g., if step 410 state is "YES"), for example, so that EC 280 may be aware of the current status of operation and inform a user thereof.

Referring now to step 404 of FIG. 4, BMU 266 determines if external power of AC adapter 255 is currently powering information handling system 200. If external power is not present (e.g., information handling system is operating on power supplied by smart battery pack 265), then method 400 returns to step 402 and starts again. However, if in step 404 BMU 266 determines that information handling system 200 is being powered by external power of AC adapter 255, then method 400 proceeds to step 406 where a timer is started. Method 400 then proceeds to step 408 where BMU 266 determines if the current timer value (i.e., elapsed time since timer was started in step 406) exceeds a threshold amount of time that the battery powered information handling system has been continuously operating on external power, i.e., indicating desktop power use behavior. The value of such an external power threshold amount of time may be selected, for example, based on factors such as battery pack capacity. For example, an external power threshold time may be predefined to be about 720 hours in one exemplary embodiment for a 3S1P Li-ion type battery, it being understood that this external power threshold time is given only as an example for illustration purposes and that greater or lesser external power threshold times may be employed. Moreover, in one exemplary embodiment such a threshold value may be determined, for example, by empirical measurement of the same battery system configuration to determine optimum or preferred external power operating time value for definition of desktop power use behavior. In another exemplary embodiment, such a threshold value may be configurable to allow changes, e.g., at time of system fabrication and/or later by a user.

If the timer value is found in step 408 to have exceeded the external power threshold value, then method 400 proceeds to step 409 where BMU 266 sets a desktop use flag and then proceeds to step 410. If the timer value is found in step 408 to not exceed the external power threshold value, the method 400 proceeds to step 410 without setting a desktop use flag. In step 410, BMU 266 determines if either the external power of AC adapter 255 and/or battery system 265 have been removed (i.e., electrically uncoupled) from portable information handling system 200. If it is determined in step 410 that external power 255 and/or battery system 265 have been removed, then method 400 proceeds to step 412 where any desktop use flag present is cleared, and the timer is reset or stopped before method 400 returns to step 402 and restarts. However, if it is determined in step 410 that neither external power 255 or battery system 265 have been removed, then method 400 proceeds from step 410 to step 414 where BMU 266 determines if a desktop use flag is present (i.e., as set in step 409), indicating the occurrence of desktop power use behavior. If so, then BMU 266 initiates one or more desktop use response actions (as described further herein) in step 416 before returning to step 402 where method 400 starts again. If no desktop use flag is found present in step 416 then normal notebook power use behavior is indicated and no response action is taken. Method 400 then returns to step 408 where BMU 266 again determines if the current timer value exceeds an external power threshold amount of time that the battery powered information handling system has been continuously operating on external power, and methodology 400 proceeds again as before.

It will be understood that the particular illustrated steps of method 400 are exemplary only, and that any other combination of additional and/or alternative steps may be employed that are suitable for monitoring, characterizing and responding to information handling system use behavior in a manner as described herein. For example, any other methodology may be employed for monitoring and determining whether battery powered information handling system 265 has been continuously operating on external AC power adapter for a time that exceeds a selected external power threshold amount of time to indicate desktop power use behavior. As another example, relative state of charge (RSOC) of battery system 265 may be additionally or alternatively monitored by BMU 266 or any other suitable processing device/s of battery system 265 or information handling system 200 to determine if the RSOC has continuously remained above a threshold minimum RSOC value for a threshold amount of time to indicate desktop power use behavior. For example, in one exemplary embodiment a threshold RSOC operating time may be predefined as about 720 hours, and a corresponding minimum threshold RSOC value may be predefined as about 95%. However, it will be understood that these values are exemplary only and that greater or lesser predefined values of threshold RSOC operating time, and/or threshold minimum RSOC value may be employed.

It will also be understood that other operating characteristics may be detected that are indicative of desktop power usage. For example, BMU 266 may determine if the fraction of a given time period (e.g., as a given percentage of cumulative operating time during the time period) that battery powered portable information handling system 200 has been operating on external power has exceeded a predefined threshold external power fractional operating time, and/or if the fraction of a given time period that battery powered portable information handling system 200 has been operating with a battery relative state of charge (RSOC) above a threshold minimum RSOC value has exceeded a predefined threshold high RSOC fractional operating time.

As described above, one or more desktop use response actions may be taken in step 416 of FIG. 4 upon determination that information handling system 200 is currently being operated in a manner characterized as desktop power use behavior. Such response actions may address the desktop power use behavior in a passive and/or active manner. For example, BMU 266 may inform embedded controller (EC) 280 and/or processor 205 by signal communication across SMBus 281 that desktop power use behavior has been detected. EC 280 running system BIOS and/or processor 205 may respond to this communication by displaying a passive message to a user of the information handling system that alerts the user that desktop behavior has been detected, and may optionally provide the user information with information on steps that may be taken to protect and extend battery life, e.g., by removing external AC power when information handling system 200 is not in use, by turning information handling system 200 off during long periods of non-use, by periodically discharging battery system 265 to perform the learning procedure of Region B of FIG. 3, etc. In another exemplary embodiment, a user may be given the option to run a desktop battery-conditioning utility that takes control of power management of information handling system 200 to perform the learning procedure of Region B of FIG. 3 or other battery discharge profile suitable for protecting battery cells 324 of battery system 265 from desktop power use behavior damage, e.g., while at the same time continuously providing power to allow use of information handling system 200. Such a passive response action relies on the user to take the necessary steps to protect the battery system 265.

Alternatively or additionally, system BIOS of EC 280 (and/or other suitable processing device/s of information handling system 200 such as processor 205) may take one or more active response actions upon notification that desktop power use behavior has been detected without requiring permission of the user. For example, a battery-conditioning utility may be automatically run without user permission that takes control of power management of information handling system 200 to perform the learning procedure of Region B of FIG. 3 or other battery discharge profile suitable for protecting battery cells 324 of battery system 265 from desktop power use behavior damage, e.g., while at the same time continuously providing power to allow use of information handling system 200. A user may be optionally notified that the utility is running or it may run in the background without the knowledge of the user.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will also be understood that one or more of the tasks, functions, or methodologies described herein (e.g., for BMU 266, EC 280, processor 205 or other suitable processing device) may be implemented, for example, as firmware or other computer program of instructions embodied in a non-transitory tangible computer readable medium that is executed by a CPU, controller, microcontroller, processor, microprocessor, FPGA, ASIC, or other suitable processing device. Further, although replaceable smart battery packs are described in relation to some of the embodiments herein, it will be understood that the disclosed systems and methods may be implemented with battery systems that are non-replaceable and/or with battery systems controlled by external processing device/s.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
one or more processing devices;
a battery system including one or more battery cells;
battery charger circuit coupled to receive current from an external source and to provide current for recharging the battery cells of the battery system; and
a system load coupled to selectably receive current from either one of an external power source or the battery system;
where the one or more processing devices are configured to:
monitor one or more power usage parameters of the information handling system,
detect usage characteristics from the monitored power usage parameters to determine whether or not the information handling system is being operated with a pre-defined desktop power use behavior that is caused by operation of the information handling system on external power from the external power source rather than only power from the battery system, and
take one or more desktop use response actions based on a determination that the detected usage characteristics indicate the information handling system is being operated with the pre-defined desktop power use behavior that is caused by operation of the information handling system on external power from the external power source rather than only power from the battery system;
where the one or more monitored power usage parameters comprise the battery system relative state of charge (RSOC); and where the one or more processing devices are configured to take the one or more desktop use response actions only if it is determined that the monitored battery relative state of charge (RSOC) has remained above a threshold minimum RSOC value for a threshold amount of time or threshold fraction of cumulative time.

2. The system of claim 1, where the pre-defined desktop power use behavior comprises operating the information handling system on external AC adapter power for a period of time without removing the AC power in a manner of operation of a desktop computer operating on an uninterruptable power supply (UPS).

3. The system of claim 1, where the one or more power usage parameters further comprise presence of external power supplied to powered information handling system rather than only power supplied from the battery system.

4. The system of claim 1, where the one or more monitored power usage parameters further comprise presence of external power supplied to powered information handling system rather than only power supplied from the battery system; and where the one or more processing devices are configured to take the one or more desktop use response actions only if a combination of the following conditions is determined to exist: a threshold amount of time or threshold fraction of cumulative time that the battery powered information handling system has been continuously operating on external power rather than only on battery power from the battery system has been determined to be exceeded, and the threshold amount of time or fraction of cumulative time that the battery relative state of charge (RSOC) has remained above the threshold minimum RSOC value has been determined to be exceeded.

5. The system of claim 1, where the one or more desktop use response actions comprise at least one of displaying a passive message to a user of the information handling system that alerts the user that desktop use behavior has been detected, automatically running a battery conditioning utility, or a combination thereof.

6. The system of claim 1, where the one or more processing devices comprise a battery management unit (BMU) communicatively coupled in signal communication with an embedded controller (EC); where the BMU is configured to monitor one or more power usage parameters of the information handling system, detect usage characteristics from the monitored power usage parameters to determine whether or not the information handling system is being operated with the pre-defined desktop power use behavior that is caused by operation of the information handling system on external power from the external power source rather than only power from the battery system, and inform the EC by signal communication that desktop power use behavior has been detected; and where the EC is configured to take the one or more desktop use response actions when informed by the BMU that desktop power use behavior has been detected.

7. The system of claim 1, where the battery system comprises a replaceable battery pack that is operably separable from the system load of the information handling system, the battery system being coupled in operational electrical contact by at least one terminal node to provide current to the system load across the terminal node.

8. The system of claim 7, where the battery system comprises a smart battery pack that includes at least one processing device.

9. The system of claim 1, where the information handling system is a notebook computer.

10. The system of claim 1, where the one or more processing devices are configured to take the one or more desktop use response actions only if external power is present to supply power to the information handling system.

11. The system of claim 1, where the one or more processing devices are configured to take the one or more desktop use response actions only if external power from AC mains and an AC adapter is present to supply power to the information handling system.

12. The system of claim 1, where the one or more monitored power usage parameters further comprise the monitored presence of external power supplied to powered information handling system rather than only power supplied from the battery system; and where the usage characteristics that indicate the information handling system is being operated with the pre-defined desktop power use behavior comprise exceeding a threshold amount of time during which an AC adapter has been continuously coupled to power the information handling system, and during which the battery cells repeatedly self-discharge followed by recharge.

13. The system of claim 1, where the one or more desktop use response actions comprise initiating a battery system learning procedure to discharge the battery cells of the battery system to a pre-defined learning point and then recharging the battery cells of the battery system to calculate an updated full charge capacity (FCC) of the battery system.

14. The system of claim 1, where the one or more desktop use response actions comprise displaying a passive message to a user of the information handling system that provides the user with information on at least one step that may be taken by the user to protect and extend battery life; and where the step provided by the information of the message comprises at least one of removing external AC power when the information handling system is not in use, turning the information handling system off during long periods of non-use, periodically discharging the battery system to perform a learning procedure, or a combination thereof.

15. The system of claim 1, where the pre-defined desktop power use behavior comprises operating the information handling system on external AC adapter power for a period of time during which the battery system remains substantially fully charged.

16. The system of claim 1, where the one or more processing devices are configured to take one or more desktop use response actions only if the detected usage characteristics are determined to indicate that the information handling system is being operated with the pre-defined desktop power use behavior that is caused by operation of the information handling system on external power from the external power source rather than only power from the battery system; and not to take the one or more desktop use response action if the detected usage characteristics are determined not to indicate the information handling system is being operated with the pre-defined desktop power use behavior that is caused by operation of the information handling system on external power from the external power source rather than only power from the battery system.

17. A method for operating an information handling system, comprising:
    providing an information handling system including one or more processing devices, a battery system including one or more battery cells, battery charger circuit coupled to receive current from an external source and to provide current for recharging the battery cells of the battery system, and a system load coupled to selectably receive current from either one of an external power source or the battery system;
    monitoring one or more power usage parameters of the information handling system, the one or more monitored power usage parameters comprising the battery system relative state of charge (RSOC);
    detecting usage characteristics from the monitored power usage parameters;
    determining whether or not the information handling system is being operated with a pre-defined desktop power use behavior that is caused by operation of the information handling system on external power from the external power source rather than only power from the battery system based on the detected usage characteristics; and
    taking one or more desktop use response actions based on a determination that the detected usage characteristics indicate the information handling system is being operated with the pre-defined desktop power use behavior that is caused by operation of the information handling system on external power from the external power source rather than only power from the battery system and only if it is determined that the monitored battery relative state of charge (RSOC) has remained above a threshold minimum RSOC value for a threshold amount of time or threshold fraction of cumulative time.

18. The method of claim 17, where the one or more power usage parameters further comprise presence of external power supplied to powered information handling system rather than only power supplied from the battery system.

19. The method of claim 17, where the one or more monitored power usage parameters further comprise presence of external power supplied to powered information handling system rather than only power supplied from the battery system; and where the method further comprises taking the one or more desktop use response actions only if a combination of the following conditions is determined to exist: a threshold amount of time or fraction of cumulative time that the battery powered information handling system has been continuously operating on external power rather than only power from the battery system is determined to have been exceeded, and the threshold amount of time or fraction of cumulative time that the battery relative state of charge (RSOC) has remained above the threshold minimum RSOC value has been determined to be exceeded.

20. The method of claim 17, where the one or more desktop use response actions comprise at least one of displaying a passive message to a user of the information handling system that alerts the user that desktop use behavior has been detected, automatically running a battery conditioning utility, or a combination thereof.

21. The method of claim 17, where the one or more processing devices comprise a battery management unit (BMU) communicatively coupled in signal communication with an embedded controller (EC); and where the method further comprises:
    using the BMU to monitor one or more power usage parameters of the information handling system, detect usage characteristics from the monitored power usage parameters to determine whether or not the information handling system is being operated with the pre-defined desktop power use behavior that is caused by operation of the information handling system on external power from the external power source rather than only power from the battery system, and inform the EC by signal communication that desktop power use behavior has been detected; and
    using the EC to take the one or more desktop use response actions when informed by the BMU that desktop power use behavior has been detected.

22. The method of claim 17, where the battery system comprises a replaceable battery pack that is operably separable from the system load of the information handling system, the battery system being coupled in operational electrical contact by at least one terminal node to provide current to the system load across the terminal node.

23. The method of claim 22, where the battery system comprises a smart battery pack that includes at least one processing device.

24. The method of claim 17, where the information handling system is a notebook computer.

25. The method of claim 17, further comprising taking the one or more desktop use response actions only if external power is present to supply power to the information handling system.

26. The method of claim 17, further comprising taking the one or more desktop use response actions only if external power from AC mains and an AC adapter is present to supply power to the information handling system.

27. The method of claim 17, where the one or more monitored power usage parameters comprise the monitored presence of external power supplied to powered information handling system rather than only power supplied from the battery system; and where the usage characteristics that indicate the information handling system is being operated with the pre-defined desktop power use behavior comprise exceeding a threshold amount of time during which an AC adapter has been continuously coupled to power the information handling system, and during which the battery cells repeatedly self-discharge followed by recharge.

28. The method of claim 17, where the one or more desktop use response actions comprise initiating a battery system learning procedure to discharge the battery cells of the battery system to a pre-defined learning point and then recharging the battery cells of the battery system to calculate an updated full charge capacity (FCC) of the battery system.

29. The method of claim 17, where the one or more desktop use response actions comprise at least one of displaying a passive message to a user of the information handling system that alerts the user to remove external AC power when the information handling system is not in use, turn the information handling system off during long periods of non-use, periodically discharge the battery system to perform a learning procedure, or a combination thereof.

30. The method of claim 17, where the pre-defined desktop power use behavior comprises operating the information handling system on external AC adapter power for a period of time without removing the AC power in a manner of operation of a desktop computer operating on an uninterruptable power supply (UPS).

31. A battery system configured to be coupled in operational electrical contact by at least one terminal node to provide current to a system load of an information handling system that is separate from the battery system, the battery system comprising:
   one or more battery cells; and
   a first processing device configured to be communicatively coupled in signal communication by at least one terminal node with a second processing device of the information handling system that is separate from the battery system;
   where the first processing device is configured to:
      monitor one or more power usage parameters of the information handling system,
      detect usage characteristics from the monitored power usage parameters to determine whether or not the information handling system is being operated with a pre-defined desktop power use behavior that is caused by operation of the information handling system on external power from the external power source rather than only power from the battery system, and
      inform the second processing device by signal communication that desktop power use behavior has been detected based on a determination that the information handling system is being operated with the pre-defined desktop power use behavior that is caused by operation of the information handling system on external power from the external power source rather than only power from the battery system;
   where the one or more monitored power usage parameters comprise the battery system relative state of charge (RSOC); and where the one or more processing devices are configured to take the one or more desktop use response actions only if it is determined that the monitored battery relative state of charge (RSOC) has remained above a threshold minimum RSOC value for a threshold amount of time or threshold fraction of cumulative time.

32. The battery system of claim 31, where the one or more power usage parameters further comprise presence of external power supplied to powered information handling system.

33. The battery system of claim 31, where the battery system is a replaceable smart battery pack; where the first processing device comprise a battery management unit (BMU); and where the BMU is configured to monitor one or more power usage parameters of the information handling system, detect usage characteristics from the monitored power usage parameters to determine whether or not the information handling system is being operated with the pre-defined desktop power use behavior that is caused by operation of the information handling system on external power from the external power source rather than only power from the battery system, and inform the second processing device by signal communication that desktop power use behavior has been detected.

34. The battery system of claim 31, where the pre-defined desktop power use behavior comprises operating the information handling system on external AC adapter power for a period of time without removing the AC power in a manner of operation of a desktop computer operating on an uninterruptable power supply (UPS).

35. An information handling system, comprising:
   one or more processing devices;
   a battery system including one or more battery cells;
   battery charger circuit coupled to receive current from an external source and to provide current for recharging the battery cells of the battery system; and
   a system load coupled to selectably receive current from either one of an external power source or the battery system;
   where the one or more processing devices are configured to:
      monitor one or more power usage parameters of the information handling system,
      detect usage characteristics from the monitored power usage parameters to determine whether or not the information handling system is being operated with a pre-defined desktop power use behavior that is caused by operation of the information handling system on external power from the external power source rather than only power from the battery system, and
      take one or more desktop use response actions if the detected usage characteristics indicate the information handling system is being operated with the pre-defined desktop power use behavior that is caused by operation of the information handling system on external power from the external power source rather than only power from the battery system;
   where the one or more monitored power usage parameters comprise the presence of external power supplied to powered information handling system rather than only power from the battery system; where the usage characteristics that indicate the information handling system is being operated with the pre-defined desktop power use behavior comprise exceeding a threshold value for the amount of time or fraction of cumulative time that the battery powered information handling system has been continuously operating on external power rather than only on battery power from the battery system; and where the threshold value of amount of time or fraction of cumulative time is determined by empirical measurement of the same battery system configuration to determine optimum or preferred external power operating time value.

36. A method for operating an information handling system, comprising:
   providing an information handling system including one or more processing devices, a battery system including one or more battery cells, battery charger circuit coupled to receive current from an external source and to provide current for recharging the battery cells of the battery system, and a system load coupled to selectably receive current from either one of an external power source or the battery system;
   monitoring one or more power usage parameters of the information handling system;
   detecting usage characteristics from the monitored power usage parameters;

determining whether or not the information handling system is being operated with a pre-defined desktop power use behavior that is caused by operation of the information handling system on external power from the external power source rather than only power from the battery system based on the detected usage characteristics; and taking one or more desktop use response actions if the detected usage characteristics indicate the information handling system is being operated with the pre-defined desktop power use behavior that is caused by operation of the information handling system on external power from the external power source rather than only power from the battery system;

where the one or more monitored power usage parameters comprise the presence of external power supplied to powered information handling system rather than only power from the battery system; where the usage characteristics that indicate the information handling system is being operated with the pre-defined desktop power use behavior comprise exceeding a threshold value for the amount of time or fraction of cumulative time that the battery powered information handling system has been continuously operating on external power rather than only on battery power from the battery system; and where the threshold value of amount of time or fraction of cumulative time is determined by empirical measurement of the same battery system configuration to determine optimum or preferred external power operating time value.

37. An information handling system, comprising:
one or more processing devices;
a battery system including one or more battery cells;
battery charger circuit coupled to receive current from an external source and to provide current for recharging the battery cells of the battery system; and
a system load coupled to selectably receive current from either one of an external power source or the battery system;
where the one or more processing devices are configured to:
   monitor one or more power usage parameters of the information handling system,
   detect usage characteristics from the monitored power usage parameters to determine whether or not the information handling system is being operated with a pre-defined desktop power use behavior that is caused by operation of the information handling system on external power from the external power source rather than only power from the battery system, and
   take one or more desktop use response actions based on a determination that the detected usage characteristics indicate the information handling system is being operated with the pre-defined desktop power use behavior that is caused by operation of the information handling system on external power from the external power source rather than only power from the battery system;
where the pre-defined desktop power use behavior comprises operating the information handling system on external AC adapter power for a period of time without removing the AC power in a manner of operation of a desktop computer operating on an uninterruptable power supply (UPS); and
where the one or more monitored power usage parameters comprise the presence of external power supplied to powered information handling system rather than only power from the battery system; where the usage characteristics that indicate the information handling system is being operated with the pre-defined desktop power use behavior comprise exceeding a threshold value for the amount of time or fraction of cumulative time that the battery powered information handling system has been continuously operating on external power rather than only on battery power from the battery system; and where the threshold value of amount of time or fraction of cumulative time is determined by empirical measurement of the same battery system configuration to determine optimum or preferred external power operating time value.

38. An information handling system, comprising:
one or more processing devices;
a battery system including one or more battery cells;
battery charger circuit coupled to receive current from an external source and to provide current for recharging the battery cells of the battery system; and
a system load coupled to selectably receive current from either one of an external power source or the battery system;
where the one or more processing devices are configured to:
monitor one or more power usage parameters of the information handling system,
detect usage characteristics from the monitored power usage parameters to determine whether or not the information handling system is being operated with a pre-defined desktop power use behavior that is caused by operation of the information handling system on external power from the external power source rather than only power from the battery system, and
take one or more desktop use response actions based on a determination that the detected usage characteristics indicate the information handling system is being operated with the pre-defined desktop power use behavior that is caused by operation of the information handling system on external power from the external power source rather than only power from the battery system;
where the pre-defined desktop power use behavior comprises operating the information handling system on external AC adapter power for a defined period of time without removing the AC power in a manner of operation of a desktop computer operating on an uninterruptable power supply (UPS);
where the one or more processing devices are configured to take one or more desktop use response actions only if the detected usage characteristics are determined to indicate that the information handling system is being operated with the pre-defined desktop power use behavior that is caused by operation of the information handling system on external power from the external power source rather than only power from the battery system; and not to take the one or more desktop use response action if the detected usage characteristics are determined not to indicate the information handling system is being operated with the pre-defined desktop power use behavior that is caused by operation of the information handling system on external power from the external power source rather than only power from the battery system;
where the one or more processing devices are configured to:
   set a desktop use flag only if the detected usage characteristics are determined to indicate the information handling system is being operated with the pre-defined desktop power use behavior that is caused by operation of the information handling system on external power from the external power source rather than only power from the battery system; and not to set the desktop use flag if the detected usage characteristics are determined not to indicate the information handling system is being operated with the pre-defined desktop power use behavior that is caused by operation of the information handling system on external power from the external power source rather than only power from the battery system, clear the desktop use flag upon detection of the removal of either the external power or the battery cells of the battery system, and then take the one or more desktop use response actions only upon detection of the presence of a previously set desktop use flag.

39. A method for operating an information handling system, comprising:

providing an information handling system including one or more processing devices, a battery system including one or more battery cells, battery charger circuit coupled to receive current from an external source and to provide current for recharging the battery cells of the battery system, and a system load coupled to selectably receive current from either one of an external power source or the battery system;

monitoring one or more power usage parameters of the information handling system;

detecting usage characteristics from the monitored power usage parameters;

determining whether or not the information handling system is being operated with a pre-defined desktop power use behavior that is caused by operation of the information handling system on external power from the external power source rather than only power from the battery system based on the detected usage characteristics; and taking one or more desktop use response actions based on a determination that if the detected usage characteristics indicate the information handling system is being operated with the pre-defined desktop power use behavior that is caused by operation of the information handling system on external power from the external power source rather than only power from the battery system;

where the one or more monitored power usage parameters comprise the presence of external power supplied to powered information handling system rather than only power from the battery system; where the usage characteristics that indicate the information handling system is being operated with the pre-defined desktop power use behavior comprise exceeding a threshold value for the amount of time or fraction of cumulative time that the battery powered information handling system has been continuously operating on external power rather than only on battery power from the battery system; and where the threshold value of amount of time or fraction of cumulative time is determined by empirical measurement of the same battery system configuration to determine optimum or preferred external power operating time value.

\* \* \* \* \*